US012678642B2

(12) United States Patent
Fegley et al.

(10) Patent No.: US 12,678,642 B2
(45) Date of Patent: Jul. 14, 2026

(54) SEALED SELF-RETRACTING LIFELINE

(71) Applicant: HONEYWELL SAFETY PRODUCTS USA, INC., Charlotte, NC (US)

(72) Inventors: Michael Fegley, Maple Grove, MN (US); Jeremy Fink, Anoka, MN (US); Jie Zhu, Shanghai (CN); Ning Qin, Shanghai (CN)

(73) Assignee: Honeywell Safety Products USA, Inc., Latham, NY (US)

( * ) Notice: Subject to any disclaimer, the term of this patent is extended or adjusted under 35 U.S.C. 154(b) by 0 days.

(21) Appl. No.: 18/582,422

(22) Filed: Feb. 20, 2024

(65) Prior Publication Data

US 2024/0189635 A1 Jun. 13, 2024

Related U.S. Application Data

(63) Continuation of application No. 16/730,513, filed on Dec. 30, 2019, now Pat. No. 11,938,354, which is a continuation of application No. 14/505,245, filed on Oct. 2, 2014, now Pat. No. 10,556,138.

(51) Int. Cl.
*A62B 35/00* (2006.01)
*A62B 1/10* (2006.01)

(52) U.S. Cl.
CPC ............ *A62B 35/0093* (2013.01); *A62B 1/10* (2013.01)

(58) Field of Classification Search
CPC .............................. A62B 1/10; A62B 35/0093
See application file for complete search history.

(56) References Cited

U.S. PATENT DOCUMENTS

| | | | |
|---|---|---|---|
| 2,500,884 | A | 3/1950 | Tessin |
| 2,896,912 | A | 7/1959 | Gabriel et al. |
| 3,325,147 | A | 6/1967 | Carlson et al. |
| 3,561,690 | A | 2/1971 | Muskat |
| 3,666,198 | A | 5/1972 | Neumann |
| 3,760,910 | A | 9/1973 | Koshihara |
| 3,790,099 | A | 2/1974 | Beller |
| 3,857,528 | A | 12/1974 | Fiala |
| 3,879,016 | A | 4/1975 | Kankkunen |

(Continued)

FOREIGN PATENT DOCUMENTS

| | | | |
|---|---|---|---|
| CN | 101918082 | A | 12/2010 |
| CN | 101959559 | A | 1/2011 |

(Continued)

OTHER PUBLICATIONS

U.S. Appl. No. 16/730,513, filed Dec. 30, 2019, U.S. Pat. No. 11,938,354, Patented.

(Continued)

*Primary Examiner* — Colleen M Chavchavadze
(74) *Attorney, Agent, or Firm* — Fredrikson & Byron, P.A.

(57) ABSTRACT

A self-retracting lifeline assembly (10) includes a housing (12), a shaft (14) fixed to the housing (12) against rotation, a drum (18) mounted for rotation on the shaft (14) and including a compartment (20) within the drum (18), a lifeline (22) wound on the drum (18), a brake module (24) carried on the shaft (14) and mounted within the compartment (20), and a pawl mechanism (26) mounted on the drum (18) for rotation therewith. The pawl mechanism (26) is mounted within the compartment (20) and configured to selectively engage the brake module (24).

20 Claims, 7 Drawing Sheets

(56) References Cited

U.S. PATENT DOCUMENTS

| | | | |
|---|---|---|---|
| 3,927,846 | A | 12/1975 | Meissner |
| 3,946,989 | A | 3/1976 | Tsuda |
| 4,206,887 | A | 6/1980 | De Rosa |
| 4,511,123 | A | 4/1985 | Ostrobrod |
| 4,846,313 | A | 7/1989 | Sharp |
| 5,186,289 | A | 2/1993 | Wolner et al. |
| 5,340,046 | A | 8/1994 | Schroth et al. |
| 5,343,976 | A | 9/1994 | Ostrobrod |
| 5,351,906 | A | 10/1994 | Feathers |
| 5,511,739 | A | 4/1996 | Dybro et al. |
| 5,533,756 | A | 7/1996 | Dybro et al. |
| 5,547,143 | A | 8/1996 | Miller et al. |
| 5,607,118 | A | 3/1997 | Dybro et al. |
| 5,611,498 | A | 3/1997 | Miller et al. |
| 5,613,647 | A | 3/1997 | Dybro et al. |
| 5,626,306 | A | 5/1997 | Miller et al. |
| 5,722,612 | A | 3/1998 | Feathers |
| 5,836,534 | A | 11/1998 | Boehmler |
| 6,106,013 | A | 8/2000 | Doty et al. |
| 6,260,782 | B1 | 7/2001 | Smithson et al. |
| 6,279,682 | B1 | 8/2001 | Feathers |
| 7,281,620 | B2 | 10/2007 | Wolner et al. |
| 8,430,207 | B2 | 4/2013 | Griffiths et al. |
| 8,490,750 | B2 | 7/2013 | Balquist et al. |
| 8,528,694 | B2 | 9/2013 | Meillet et al. |
| 8,800,715 | B2 | 8/2014 | Olson et al. |
| 8,950,551 | B2 | 2/2015 | Jones et al. |
| 9,121,462 | B2 | 9/2015 | Casebolt |
| 10,022,571 | B2 | 7/2018 | Jones et al. |
| 10,556,138 | B2 | 2/2020 | Fegley et al. |
| 10,744,354 | B2 | 8/2020 | Choate et al. |
| 11,938,354 | B2 | 3/2024 | Fegley et al. |
| 2003/0136610 | A1 | 7/2003 | Sato |
| 2007/0187542 | A1 | 8/2007 | Ng et al. |
| 2009/0084631 | A1 | 4/2009 | Casebolt |
| 2010/0116922 | A1 | 5/2010 | Choate et al. |
| 2010/0236867 | A1 | 9/2010 | Jones et al. |
| 2010/0252366 | A1 | 10/2010 | Jones et al. |
| 2011/0315482 | A1 | 12/2011 | Griffiths et al. |
| 2012/0132481 | A1 | 5/2012 | Jones |
| 2012/0298451 | A1 | 11/2012 | Griffiths et al. |
| 2013/0206510 | A1 | 8/2013 | Casebolt |

FOREIGN PATENT DOCUMENTS

| | | |
|---|---|---|
| GB | 2467953 A | 8/2010 |
| WO | 92/11065 A1 | 7/1992 |

OTHER PUBLICATIONS

U.S. Appl. No. 14/505,245, filed Oct. 2, 2014, U.S. Pat. No. 10,556,138, Patented.

EP Office Action Mailed on Jul. 9, 2024 for EP Application No. 21161597, 9 page(s).

Advisory Action (PTOL-303) Mailed on Aug. 2, 2019 for U.S. Appl. No. 14/505,245.

Advisory Action (PTOL-303) Mailed on Sep. 13, 2019 for U.S. Appl. No. 14/505,245.

Annex to the communication Mailed on Feb. 14, 2020 for EP Application No. 15187504.

Annex to the communication Mailed on Oct. 15, 2019 for EP Application No. 15187504.

Chinese Office Action dated Jun. 24, 2019, for Application No. 201510925002.3, 15 pages.

CN Notice of Allowance Mailed on May 8, 2020 for CN Application No. 201510925002.

Communication about intention to grant a European patent Mailed on May 4, 2021 for EP Application No. 15187504, 5 pages.

Communication about intention to grant a European patent Mailed on Nov. 25, 2020 for EP Application No. 15187504.

Communication from the Examining Division Mailed on Oct. 15, 2019 for EP Application No. 15187504.

Decision to grant a European patent received for European Application No. 15187504.4, mailed on Oct. 7, 2021, 2 pages.

English translation of CN Notice of Allowance dated May 8, 2020 for CN Application No. 201510925002, 2 page(s).

EP Office Action Mailed on Jun. 9, 2021 for EP Application No. 21161597.

European search opinion Mailed on Feb. 25, 2016 for EP Application No. 15187504.

European search report Mailed on Feb. 25, 2016 for EP Application No. 15187504.

Examiner initiated interview summary (PTOL-413B) Mailed on May 17, 2019 for U.S. Appl. No. 14/505,245.

Examiner initiated interview summary (PTOL-413B) Mailed on Oct. 3, 2019 for U.S. Appl. No. 14/505,245.

Examiner Interview Summary Record (PTOL - 413) Mailed on Dec. 27, 2023 for U.S. Appl. No. 16/730,513, 1 page(s).

Extended European search report Mailed on Jun. 9, 2021 for EP Application No. 21161597, 9 pages.

Final Rejection Mailed on Jul. 24, 2017 for U.S. Appl. No. 14/505,245.

Final Rejection Mailed on Jun. 7, 2018 for U.S. Appl. No. 14/505,245.

Final Rejection Mailed on Jun. 23, 2016 for U.S. Appl. No. 14/505,245.

Final Rejection Mailed on May 17, 2019 for U.S. Appl. No. 14/505,245.

Final Rejection Mailed on Sep. 26, 2023 for U.S. Appl. No. 16/730,513, 11 page(s).

Non-Final Rejection Mailed on Jan. 12, 2018 for U.S. Appl. No. 14/505,245.

Non-Final Rejection Mailed on Mar. 20, 2017 for U.S. Appl. No. 14/505,245.

Non-Final Rejection Mailed on Mar. 28, 2023 for U.S. Appl. No. 16/730,513, 17 page(s).

Non-Final Rejection Mailed on May 13, 2016 for U.S. Appl. No. 14/505,245.

Non-Final Rejection Mailed on Nov. 30, 2018 for U.S. Appl. No. 14/505,245.

Notice of Allowance and Fees Due (PTOL-85) Mailed on Dec. 27, 2023 for U.S. Appl. No. 16/730,513, 10 page(s).

Notice of Allowance and Fees Due (PTOL-85) Mailed on Oct. 3, 2019 for U.S. Appl. No. 14/505,245.

SEALED SELF-RETRACTING LIFELINE

CROSS-REFERENCE TO RELATED APPLICATIONS

This application is a continuation of U.S. patent application Ser. No. 16/730,513, filed Dec. 30, 2019, entitled "Sealed Self-Retracting Lifeline," which is a continuation of U.S. patent application Ser. No. 14/505,245, filed Oct. 2, 2014 (now U.S. Pat. No. 10,556,138, issued Feb. 11, 2020), entitled "Sealed Self-Retracting Lifeline," the entire contents of each of which are hereby incorporated herein by reference in their entirety for all purposes.

FEDERALLY SPONSORED RESEARCH OR DEVELOPMENT

Not Applicable.

MICROFICHE/COPYRIGHT REFERENCE

Not Applicable.

FIELD

This disclosure is related to fall protection equipment and particularly to self-retracting lifelines.

BACKGROUND

Self-retracting lifelines are well known and are commonly configured to arrest a user's weight in the event of a fall from a height and to do so within a prescribed distance and without exerting above a prescribed force on the user in an attempt to prevent significant trauma to the user. In this regard, it is known to incorporate a braking mechanism into the self-retracting lifeline. Because they are often used in industrial and construction environments, self-retracting lifelines are often exposed to extreme environments, including extreme environments such as off-shore oil drilling and other corrosive environments. While several known self-retracting lifelines work satisfactorily for their intended purpose, there is always room for improvement.

SUMMARY

In accordance with one feature of this disclosure, a self-retracting lifeline assembly is provided and includes a housing, a shaft fixed to the housing against rotation relative to the housing about a central axis of the shaft, a drum mounted for rotation on the shaft and including a compartment within the drum, a lifeline wound on the drum for selective deployment and retraction from and to the housing, a brake module carried on the shaft and mounted within the compartment of the drum, and a pawl mechanism mounted on the drum for rotation therewith. The pawl mechanism is mounted within the compartment and configured to selectively engage the brake module in response to a predetermined rotational speed of the drum relative to the shaft.

As one feature, the compartment is a sealed compartment.

In one feature, at least one rotating seal is mounted between the drum and the shaft.

According to one feature, the rotating seal is mounted to the drum.

As one feature, a spring mechanism is connected to the shaft and the drum to provide a rotational retracting force to the drum.

In one feature, a cover surrounds the spring mechanism and is mounted to the drum for rotation therewith.

According to one feature, at least one rotating seal is mounted between the cover and the shaft, and at least one seal is sandwiched between the cover and the drum.

As one feature, the at least one rotating seal is a radial lip seal and the cover mounts the radial lip seal for rotation with the cover and the drum, the radial lip seal sealingly engaged with the shaft.

In one feature, the brake module is a disc brake module.

According to one feature, the disc brake module includes at least one friction disc fixed against rotation to the shaft, and at least one friction disc that is rotatable relative to the shaft and engageable with the pawl mechanism.

As one feature, the brake module can be assembled to and removed from the self-retracting lifeline assembly as a self-contained subassembly.

In one feature, the drum is a two-piece construction and includes a seal sandwiched between the two drum pieces to seal the compartment.

According to one feature, one of the drum pieces defines the compartment and the other of the drum pieces forms a cover for closing the compartment.

As one feature, one of the drum pieces mounts a first bearing for rotatable engagement with the shaft, and the other of the drum pieces mounts a second bearing for rotatable engagement with the shaft.

In one feature, the first and second bearings are located on opposite axial sides of the compartment.

Other features and advantages will become apparent from a review of the entire specification, including the appended claims and drawings.

DETAILED DESCRIPTION

Figure 1:
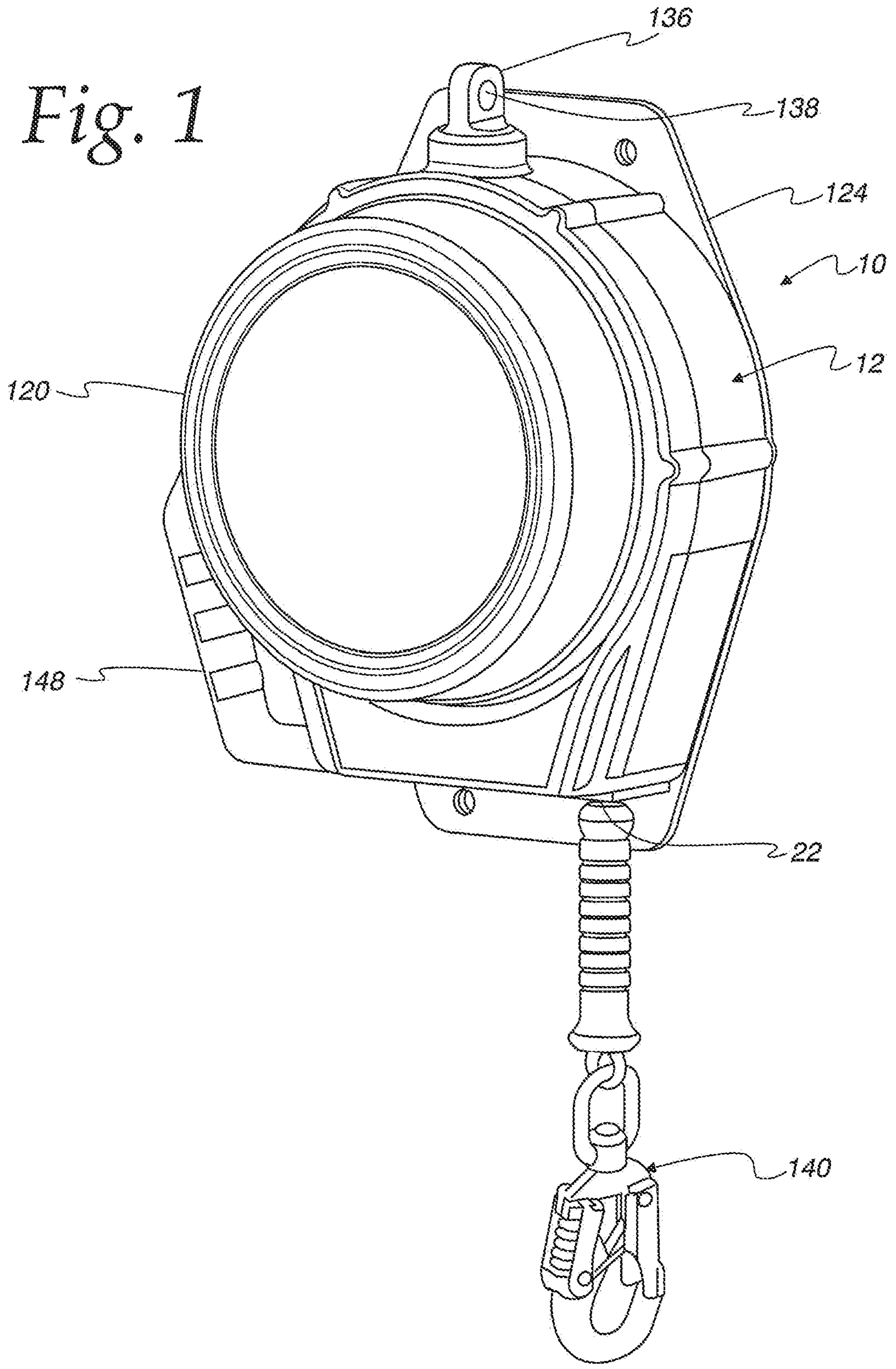
FIG. 1 is an isometric view from the front of a self-retracting lifeline according to this disclosure.
Figure 2:
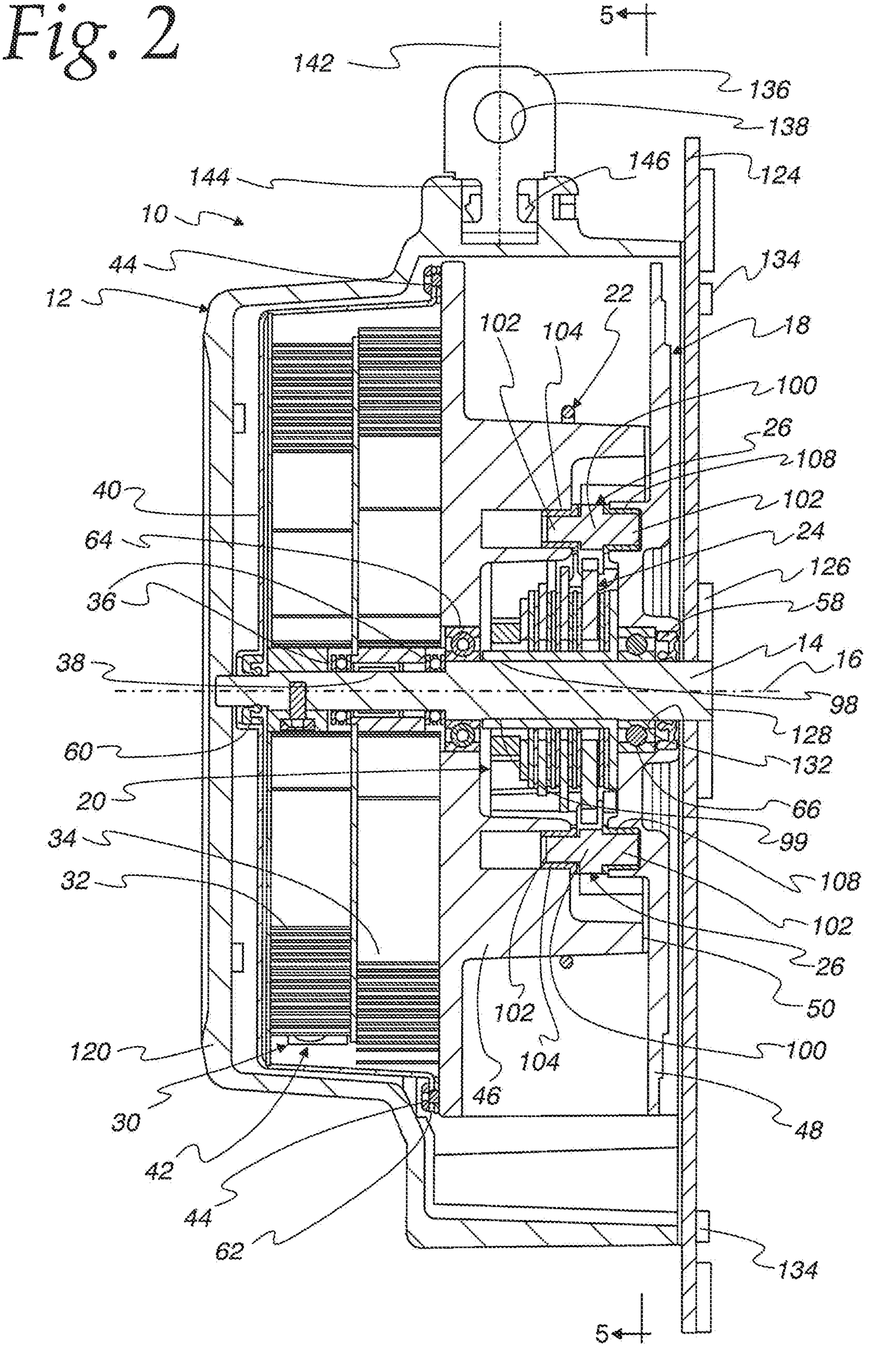
FIG. 2 is an enlarged cross-sectional view taken along line 2-2 in FIG. 1.
Figure 4:
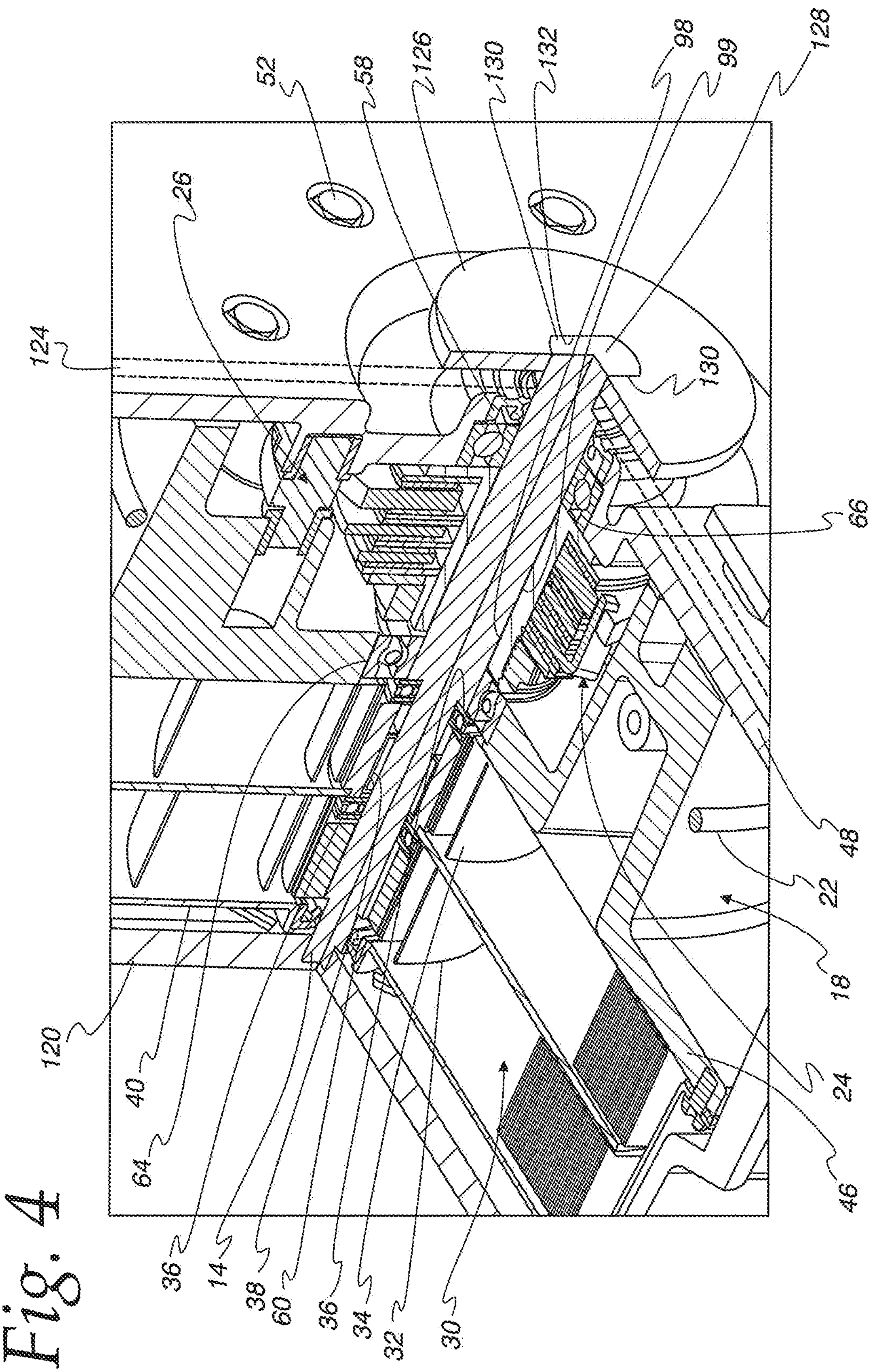
FIG. 4 is an enlarged view of a portion of FIG. 3.

As best seen in FIGS. 1, 2 and 4, a self-retracting lifeline assembly 10 includes a frame or housing 12, a shaft 14 fixed to the housing 12 against rotation relative to the housing 12 about a central axis 16 of the shaft 14, a lifeline reel or drum 18 mounted on the shaft 14 for rotation relative to the shaft 14 and the housing 12 and including a compartment 20 within the drum 18, a lifeline (shown schematically at 22) wound on the drum for selective deployment from and retraction into the housing 12, a brake module 24 carried on the shaft 14 and mounted within the compartment 20 of the drum 18, and a pawl mechanism 26 mounted on the drum 18 for rotation therewith, the pawl mechanism 26 being mounted within the compartment 20 and configured to selectively engage the brake module 24 in response to a predetermined rotational speed of the drum 18 relative to the shaft 14. It should be appreciated that while the lifeline 22 is illustrated as a cable in the figures, there are many known types of lifeline configurations that are known and are suitable within the scope of this disclosure, such as, for example, lifelines formed of webbing.

The self-retracting lifeline assembly 10 further includes a retraction spring mechanism, shown generally at 30, connected between the shaft 14 and the drum 18 to provide a rotational retracting force to the drum 18 for retracting deployed lengths of the lifeline 22. In the illustrated embodiment, the spring mechanism 30 is provide in the form of two flat, spiral springs 32 and 34 that are connected in series between the shaft 14 and the drum 18, with the spring 32 having a portion fixed to the shaft 14 and the spring 34 having a portion fixed to the drum 18, and the portion 14 mounted for rotation relative to the shaft 14 by axial ball bearings 36 and a radial bearing 38. It should be appreciated that while a specific spring mechanism 30 that will be desirable in many applications is shown in the illustration, there are many known types of springs and spring configurations that can be used to provide a rotational retracting force to the drum 18 and this disclosure anticipates any suitable spring mechanism for such a purpose.

In the illustrated embodiment, a cover/housing 40 defines a chamber 42 and surrounds the spring mechanism 30. The cover/housing is fixed to the drum 18 for rotation therewith relative to the shaft 14. The cover/housing 40 can be of any suitable material, such as stamped metal or molded plastic or composite, and can be fixed to the drum 18 using any suitable means, including any suitable fasteners, such as the circumferentially spaced, threaded fasteners 44 best seen in FIG. 2.

Figure 5:
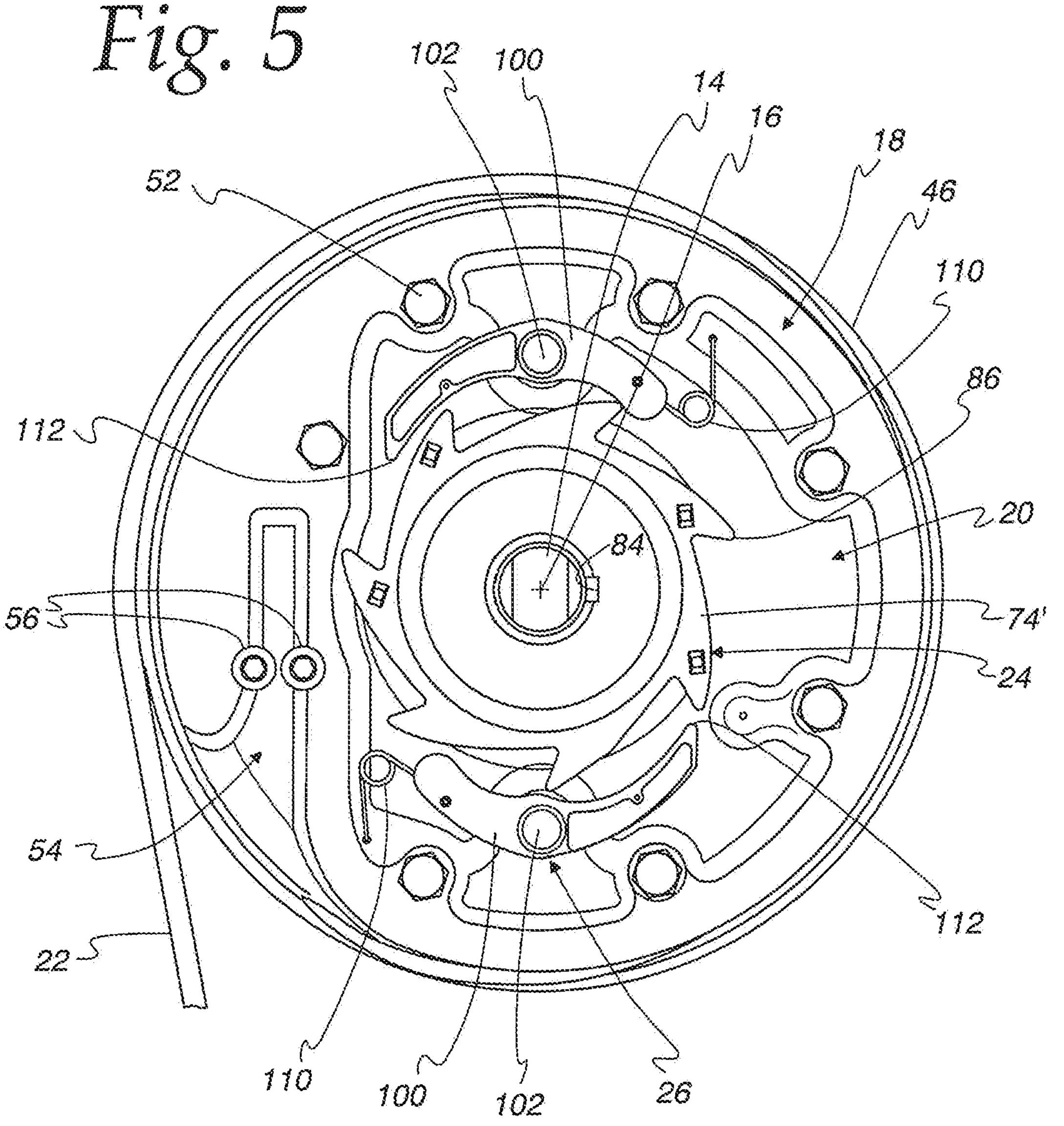
FIG. 5 is a view taken generally along line 5-5 in FIG. 2 showing selected components of the self-retracting lifeline assembly.

In the illustrated embodiment, the drum 18 is a two piece construction, with one piece 46 defining the compartment 20, and the other piece 48 forming a cover for closing the compartment 20. In the illustrated embodiment, a seal 50 in the form of a gasket 50 is sandwiched between the drum pieces 46 and 48 to seal the compartment 20. The two drum pieces 46 and 48 can be joined together using any suitable means, including any suitable fastener, such as the circumferentially spaced, threaded fasteners 52, best seen in FIG. 3 that extend through fastener bosses in the drum piece 48 and into engagement with threaded openings in the drum piece 46. As best seen in FIG. 5, the compartment 20 is defined in the drum piece 46. The drum piece 46 also includes a lifeline retaining relief or slot 54 that can receive an end of the lifeline 22 to retain the lifeline 22 to the drum 18 and the drum piece 46, with suitable retention means, such as threaded fasteners 56 being provided to further secure the end of the lifeline 22 within the slot 54. The drum pieces 46 and 48 can be made of any suitable material, including, for example, any suitable cast or machined metal or any suitable molded plastic or composite material.

To further assist in sealing the compartment 20 and chamber 42, a rotating seal in the form of radial lip seal 58 is provided between the shaft 14 and the drum piece 48 to allow scaled rotational movement between the drum 18 and the shaft 14, and a rotating seal in the form of a radial lip seal 60 is provided between the cover/housing 40 and the shaft 14, again to provide scaled rotational movement between the shaft 14 and the cover/housing 40. In the illustrated embodiment, the lip seal 58 is mounted to the drum piece 48 for rotation therewith in sealed rotational engagement with the shaft 14, and the lip seal 60 is mounted to the cover/housing 40 for rotation therewith in sealed rotational engagement with the shaft 14. Finally, a seal 62 in the form of a gasket 62 is sandwiched between the cover/housing 40 and the drum piece 46 so as to completely seal the compartment 20 and the components contained therein and the chamber 42 and the components contained therein. It should be appreciated that while specific forms of the seals 50, 58, 60 and 62 that will be desirable in many applications have been shown, many suitable forms of seals are known and are anticipated for use within the scope of this disclosure.

As best seen in FIGS. 2 and 4, in the illustrated embodiment, the drum 18 is rotationally mounted to the shaft 14 by a first ball bearing 64 mounted between the shaft 14 and the drum piece 46, and a second ball bearing 66 mounted between the shaft 14 and the drum piece 48. It should be appreciated that while specific forms of bearings that will be desirable in many applications are shown in the illustrated embodiment, there are many suitable forms of bearings that could be utilized within the scope of this disclosure, including journal bearings and other forms of ball bearings.

Figure 6:
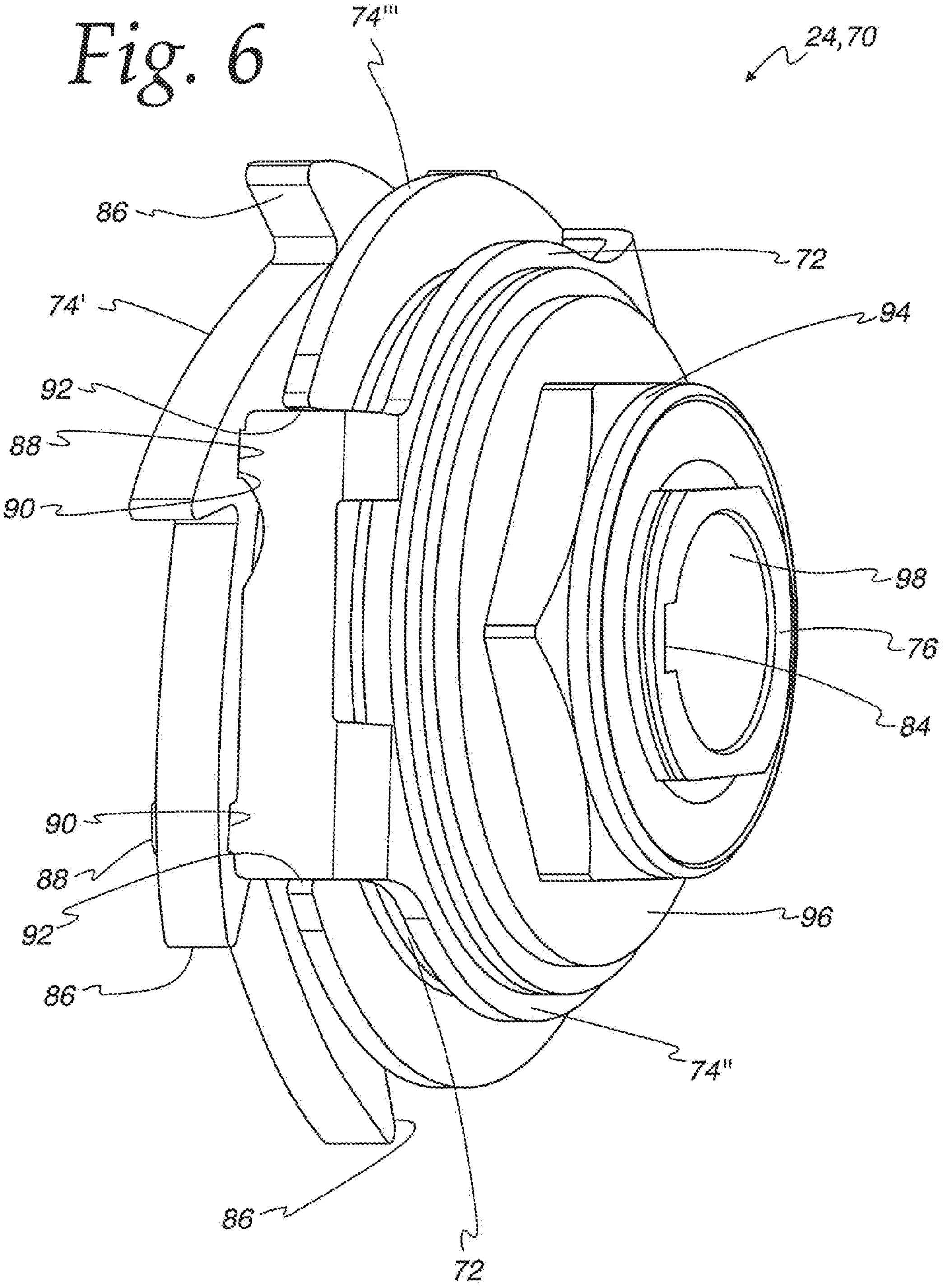
FIG. 6 is an isometric view of a self-contained brake module subassembly of the self-retracting lifeline assembly of FIGS. 1-5.
Figure 7:
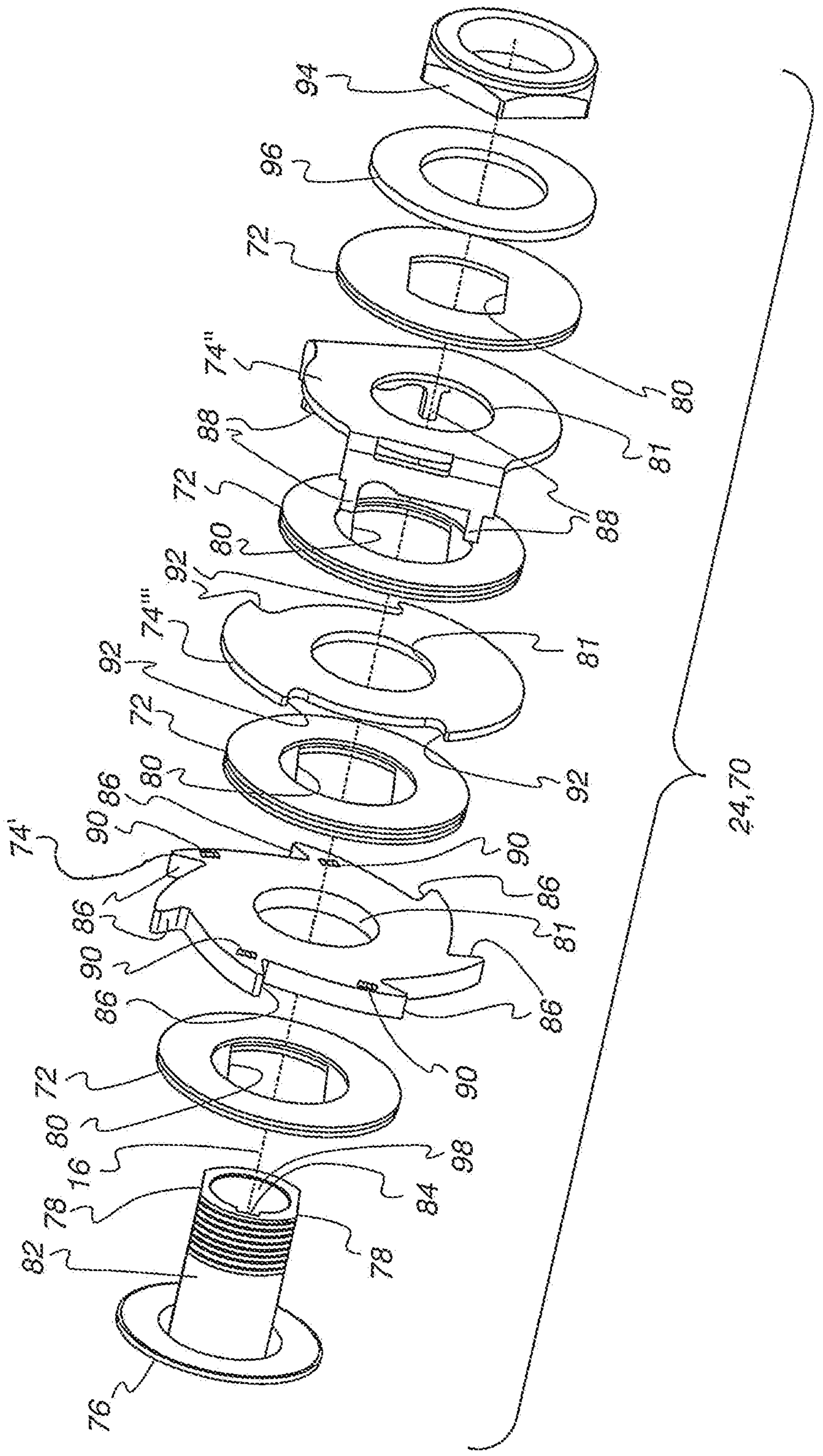
FIG. 7 is an exploded isometric view of the brake module of FIG. 6.

As best seen in FIG. 6, the brake module 24 is provided in the form of a self-contained module or subassembly 70 that can be assembled to and removed from the self-retracting lifeline assembly 10 as a self-contained unit or subassembly, such as in the form shown in FIG. 5. As best seen in FIGS. 6 and 7, the brake mechanism 24 is a disc brake module 24, 70 and includes a plurality of friction plates or discs 72 that are fixed against rotation relative to shaft 14 and a plurality of friction plates or discs 74 that are rotatable relative to the shaft 14 and engageable with the pawl mechanism 26. In this regard, the friction discs 72 are fixed against rotation relative to a disc mount 76 by a pair of oppositely facing, flat surfaces 78 on the disc mount 76 and conforming interior surfaces 80 on each of the friction discs 72, whereas the rotatable friction discs 74 have cylindrical interior surfaces 81 that can rotate freely relative to the disc mount 76 while being guided or journalled in that rotation by oppositely facing, conforming cylindrical surfaces 82 (only shown in FIG. 7) on the disc mount 76. The disc mount 76 is fixed against rotation to the shaft 14 via any suitable means, many of which are known, such as, for example, via a conventional key (not shown) that is received within a keyed recess 84 of the disc mount and a corresponding keyed recess (not shown) in the shaft 14. One of the rotatable friction discs 74 is a pawl engagement disc 74' and includes a plurality of circumferentially spaced, radially outwardly extending pawl engagement teeth or surfaces 86 for selective engagement with the pawl mechanism 26. The remaining rotatable friction discs 74 are fixed for rotation with the pawl engagement disc 74' via axially extending flanges 88 provided on one of the rotatable friction discs 74" that extend into receiving openings 90 on the pawl engagement disc 74' and engage against abutment surfaces 92 on any intervening rotatable discs 74". The discs 72 and 74 are on retained the disc mount 76 by a threaded lock nut 94 that forces the discs 72 and 74 into frictional engagement via an axial pre-load force transmitted through a washer 96. In the assembled state shown in FIG. 6, the disc module subassembly 24, 70 can be assembled onto and removed from the shaft 14 as a self-contained subassembly, with cylindrical inside surface 98 of the disc mount 76 being guided by a cylindrical outer surface 99 of the shaft 14, as best seen in FIGS. 2 and 4.

While the illustrated brake module 24 will be desirable in a number of applications, it should be understood that there are many types of brake modules that may be suitable for other applications and that are contemplated within the scope of this disclosure.

As best seen in FIG. 5, the pawl mechanism 26 includes a pair of pawls 100, with each pawl 100 being trunnion mounted on opposite sides of the pawls 100 to the drum pieces 46 and 48. In this regard, as best seen in FIG. 2, each of the pawls 100 has a pair of oppositely extending journals 102, with one of the journals 102 being received in a journal bearing 104 in the drum piece 46 and the other journal 102 being received in a journal bearing 108 in the housing piece 48. As best seen in FIG. 5, torsion springs 110 are engaged between the drum piece 48 and each of the pawls 100 in order to preload the pawls to rotate (clockwise in FIG. 5) out of engagement with the brake module. The pawls 100 are weighted such that the center of mass for each pawl 100 is located on the opposite side of the pawl 100 from a brake module engagement tooth or surface 112 so that on that centrifugal force will urge the pawl 100 to rotate (counter-clockwise in FIG. 5) against the spring force until the engagement surface 112 engages with one of the engagement surfaces 86 on the rotatable friction disc 74' of brake module 24. The pre-load of the springs 110 and the mass and center of mass of the pawls 100 are selected so that each of the pawls 100 will rotate into engagement with the brake module 24 at a predetermined, desired rotational speed of the drum 18 relative to the shaft 14.

While the pawl mechanism 26 in the illustrated embodiment will prove desirable in a number of applications, it should be understood that other suitable pawl mechanisms can be incorporated into the assembly 10 within the scope of this disclosure.

Figure 3:
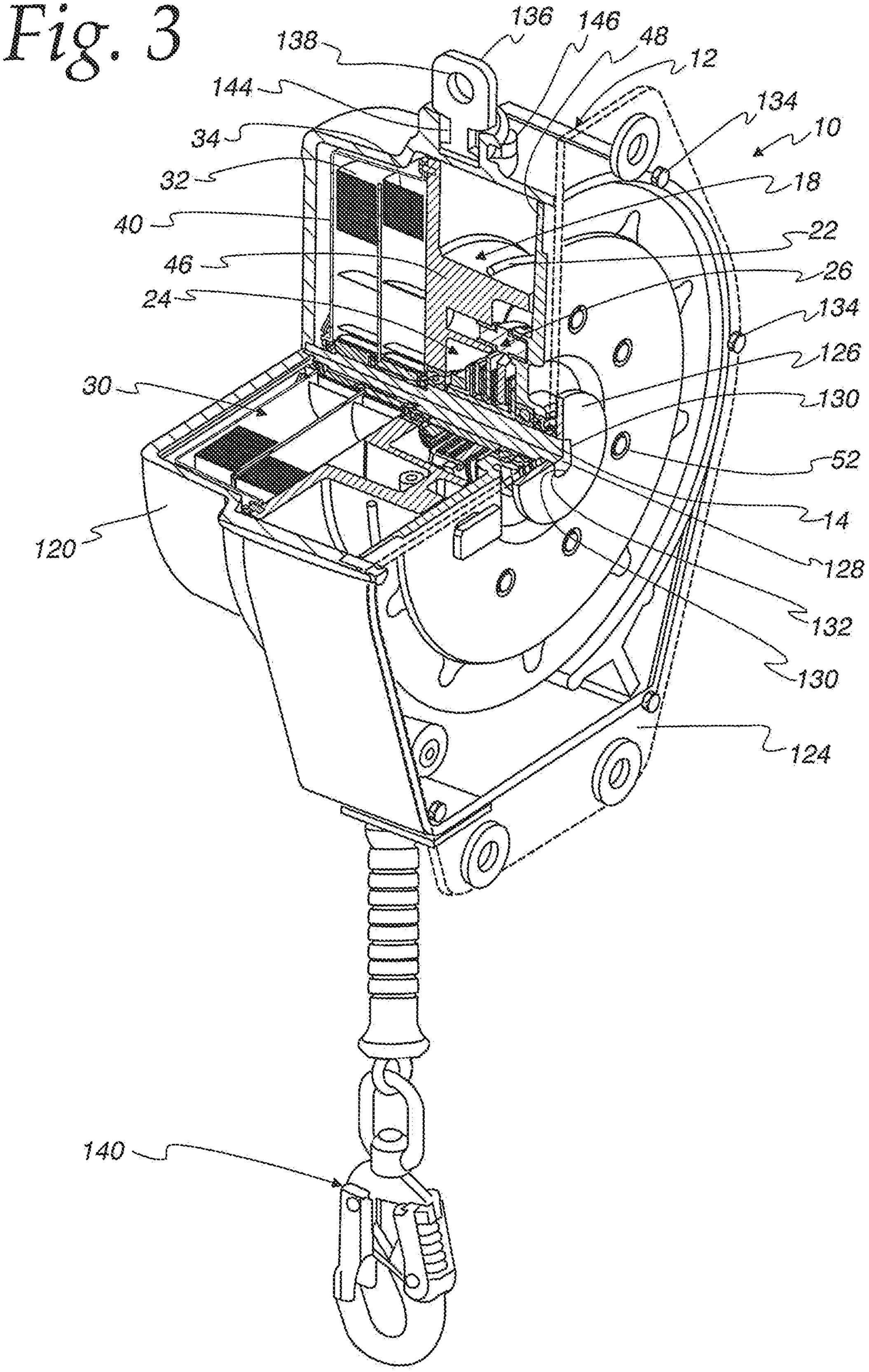
FIG. 3 is an isometric view from the rear of the self-retracting lifeline of one assembly of FIG. 1, with a quadrant cut away and a housing component shown as transparent for purposes of illustration.

In the illustrated embodiment, the housing 12, includes a main housing piece 120 that defines a chamber 122 for receiving and surrounding the working/rotating components of the assembly 10, and a cover piece 124 for closing the chamber 122. As best seen in FIG. 3, the cover piece 124 includes an anti-rotation feature 126 in the form of a reinforcement plate or disc 126 that engages an end 128 of the shaft 14 to prevent rotation of the shaft 14 relative to the housing 12. In this regard, the end 128 of the shaft 14 includes oppositely facing, flat surfaces 130 that are engaged in a conforming opening 132 in the anti-rotation feature 126. The cover piece 124 can be joined to the main housing piece 120 using any suitable means, such as, for example, the threaded fasteners 134 best seen in FIG. 3. The housing 12 also includes a connector 136 having an opening 138 therein to allow connection of the assembly 10 to an anchor or other piece of fall protection equipment. Similarly, a connector 140 is provided on the lifeline 22 to allow the lifeline 22 to be connected to other fall protection equipment, such as, for example, an anchor or harness worn by a user. As best seen in FIGS. 2 and 3, in the illustrated embodiment, the connector 136 is fixed to the main housing piece 120 so as to allow the connector 136 to rotate about a central axis 142. In this regard, the connector 136 includes an annular channel 144 that receives a portion of a threaded fastener 146 that retains the connector 136 to the main housing piece 120 while allowing the connector 136 to rotate about the axis 142. Optionally, the main housing piece 120 may include an integrally formed handle 148 that can be gripped by a user's hand, as best seen in FIG. 1. It should be appreciated that while a specific form of the housing 12 is shown in the figures and will prove desirable in many applications, the housing 12 can take on many configurations within the scope of this disclosure.

It will be appreciated by those skilled in the art that the disclosed self-retracting lifeline assembly 10 protects the working components of the assembly 10 by providing the scaled compartment 20 for enclosing the brake module 24 and the pawl mechanism 26, and the scaled chamber 42 for enclosing the spring mechanism 30, with the bearings 64 and 66 being protected within the sealed compartment 20 and chamber 42. It will also be appreciated that the disclosed assembly 10 allows for the maintenance of the pawl mechanism 26 and brake module 24 by simply removing the housing cover piece 124 and the drum piece 48 which then allows for the brake module subassembly 24, 70 to be removed as a self-contained unit for servicing, inspection or replacement and also allows for easy access to the components of the pawl mechanism 26 for servicing, inspection or replacement.

It should be understood that while specific forms and configurations of the components of the subassembly 10 have been shown herein, alterations of those configurations and components are contemplated within the scope of this disclosure and no limitation to the specific configurations and forms shown are intended unless expressly recited in an appended claim.

The invention claimed is:

1. A self-retracting lifeline assembly comprising:
- a housing;
- a housing cover piece;
- a shaft having a proximal end and a distal end, the shaft fixedly coupled at the proximal end to the housing, thereby preventing rotational motion of the shaft relative to the housing;
- a spring carried on the shaft;
- a drum comprising a pawl mechanism, the drum supported upon the shaft at a position distal the spring, the drum configured to retain a lifeline for selective deployment and retraction; and
- a brake module carried on the shaft at a position distal the spring and distal the position at which the drum is supported on the shaft, wherein the brake module can be disposed to and removed from the shaft via the distal end without moving the spring relative to an axial direction of the shaft, the brake module comprising:
  - a disc mount removably receivable on the shaft and fixed against rotation relative to the shaft; and
  - a first rotatable frictional element and a second rotatable frictional element, both mounted on the disc mount and rotatable relative to the shaft, wherein the first rotatable frictional element is fixed for rotation with the second rotatable frictional element via axially extending flanges provided on the first rotatable frictional element that extend into receiving openings on the second rotatable frictional element, and wherein the second rotatable frictional element is a pawl engagement disc for selective engagement with the pawl mechanism.

2. The self-retracting lifeline assembly of claim 1, wherein the drum is a two-piece construction with a first drum portion defining a compartment and a second drum portion forming a cover for closing the compartment.

3. The self-retracting lifeline assembly of claim 2, wherein the housing cover piece and the second drum portion are removable to allow for removal of the brake module as a self-contained subassembly.

4. The self-retracting lifeline assembly of claim 1, wherein the drum extends radially from the shaft and axially towards the distal end of the shaft such that the drum extends substantially about the brake module.

5. The self-retracting lifeline assembly of claim 2, wherein the second drum portion is supported upon the shaft at a position distal the brake module, and wherein a seal is sandwiched between the first drum portion and the second drum portion such that the first drum portion and the second drum portion are configured to be disposed about the brake module when assembled on the shaft.

6. The self-retracting lifeline assembly of claim 5, wherein the seal sandwiched between the first drum portion and the second drum portion is operable to allow for sealed rotational movement of the two-part drum radially about the shaft.

7. The self-retracting lifeline assembly of claim 1, wherein the spring is configured to apply a winding force to the drum.

8. The self-retracting lifeline assembly of claim 7, wherein the brake module further comprises:

a fixed frictional element mounted on the disc mount, wherein the fixed frictional element is fixed against rotation relative to the shaft and the first and second rotatable frictional elements are rotatable relative to the fixed frictional element; and a securing element secured to the disc mount for maintaining the fixed frictional element and the first and second rotatable frictional elements held in forced frictional engagement against each other and retained against axial movement within the brake module.

9. The self-retracting lifeline assembly of claim 8, wherein the pawl mechanism is mounted on the drum for rotation therewith and configured to selectively engage the brake module in response to a pre-determined rotational speed of the drum relative to the shaft.

10. The self-retracting lifeline assembly of claim 8, wherein the brake module is configured to be assembled to and removed from the self-retracting lifeline assembly as a self-contained subassembly.

11. A self-retracting lifeline assembly comprising:

a housing;

a housing cover piece;

a shaft having a proximal end and a distal end, the shaft fixed at the proximal end to the housing such that rotation of the shaft relative to the housing about a central axis of the shaft is prevented;

a spring carried on the shaft;

a drum comprising a pawl mechanism, the drum supported upon the shaft at a position distal the spring, the drum configured to retain a lifeline for selective deployment and retraction, the spring configured to apply a rotational force to the drum relative to the shaft; and a brake module carried on the shaft at a position distal the spring and distal the position at which the drum is supported on the shaft, the drum extending radially from the shaft and axially towards the distal end of the shaft such that the drum extends substantially about the brake module, the brake module being configured to be slidably removed from the distal end of the shaft, wherein the brake module can be disposed to and removed from the shaft via the distal end without moving the spring relative to an axial direction of the shaft, and wherein the brake module comprises:

a disc mount removably receivable on the shaft and fixed against rotation relative to the shaft; and a first rotatable frictional element a second rotatable frictional element, both mounted on the disc mount and rotatable relative to the shaft, wherein the first rotatable frictional element is fixed for rotation with the second rotatable frictional element via axially extending flanges provided on the first rotatable frictional element that extend into receiving openings on the second rotatable frictional element, and wherein the second rotatable frictional element is a pawl engagement disc for selective engagement with the pawl mechanism.

12. The self-retracting lifeline assembly of claim 11, wherein the drum is a two piece construction with a first drum portion defining a compartment and a second drum portion forming a cover for closing the compartment.

13. The self-retracting lifeline assembly of claim 12, wherein the second drum portion is supported upon the shaft at a position distal the brake module.

14. The self-retracting lifeline assembly of claim 13, wherein a seal is sandwiched between the first drum portion and the second drum portion such that the first drum portion and the second drum portion are configured to be disposed about the brake module when assembled on the shaft.

15. The self-retracting lifeline assembly of claim 14, wherein the seal mounted between the first drum portion and the second drum portion is operable to allow for sealed rotational movement of the two-part drum radially about the shaft.

16. The self-retracting lifeline assembly of claim 11, wherein the brake module further comprises a securing element secured to the disc mount for maintaining the first and second rotatable frictional elements held in forced frictional engagement against each other and retained against axial movement within the brake module.

17. The self-retracting lifeline assembly of claim 11, wherein the pawl mechanism is mounted on the drum for rotation therewith and configured to selectively engage the brake module in response to a pre-determined rotational speed of the drum relative to the shaft.

18. The self-retracting lifeline assembly of claim 11, wherein the brake module is configured to be assembled to and removed from the self-retracting lifeline assembly as a self-contained subassembly.

19. The self-retracting lifeline assembly of claim 11, wherein the brake module is configured to be assembled to and removed from the self-retracting lifeline assembly without moving either the lifeline or the spring relative to the axial direction of the shaft.

20. The self-retracting lifeline assembly of claim 11, wherein the brake module further comprises at least one intervening rotatable frictional element mounted on the disc mount between the first and second rotatable frictional elements, wherein the axially extending flanges provided on the first rotatable frictional element engage against abutment surfaces on the least one intervening rotatable element when extended into the receiving openings on the second rotatable frictional element.

* * * * *